United States Patent [19]

Freeman

[11] Patent Number: 4,753,432
[45] Date of Patent: Jun. 28, 1988

[54] FEEDER MODULE

[75] Inventor: Gerald C. Freeman, Darien, Conn.

[73] Assignee: Pitney Bowes Inc., Stamford, Conn.

[21] Appl. No.: 909,383

[22] Filed: Sep. 19, 1986

[51] Int. Cl.⁴ ............................................. B65H 3/04
[52] U.S. Cl. ........................................ 271/35; 271/122
[58] Field of Search ................... 271/35, 121, 122, 125

[56] References Cited

U.S. PATENT DOCUMENTS

| | | | |
|---|---|---|---|
| 1,066,027 | 7/1913 | Markoe | 271/122 |
| 1,866,847 | 7/1932 | Finfrock | 271/35 |
| 1,955,066 | 4/1934 | Hiller | 271/35 |
| 3,506,258 | 4/1970 | Lindquist | 271/125 X |
| 3,933,350 | 1/1976 | Mignano | 271/125 X |
| 3,965,815 | 6/1976 | Lupkus et al. | 101/91 |
| 3,970,298 | 7/1976 | Irvine | 271/122 X |
| 3,978,457 | 8/1976 | Check et al. | 340/172.5 |
| 4,050,374 | 9/1977 | Check | 101/91 |
| 4,144,786 | 3/1979 | Beard | 271/35 X |
| 4,193,590 | 3/1980 | Mongagnino | 271/125 X |
| 4,287,825 | 9/1981 | Eckert et al. | 101/91 |
| 4,302,821 | 11/1981 | Eckert et al. | 364/900 |

Primary Examiner—Richard A. Schacher
Attorney, Agent, or Firm—Lawrence E. Sklar; David E. Pitchenik; Melvin J. Scolnick

[57] ABSTRACT

A mailing system for metering batches of mixed weight mail. The system includes a demand feed for singulating mailpieces, a weighing module for weighing the singulated mailpieces and determining the appropriate postage amount and a postage meter responsive to the weighing module for metering each singulated mailpiece with the appropriate postage amount. A transport system sequentially transports singulated mailpieces from the feeder to the weighing module when the postage meter is set then stops during the weighing period. The postage meter is set for the next sequential mailpiece only after weighing and metering are both completed. In another embodiment a mechanical buffer is provided between the weighing module and the meter to allow overlapping of weighing time with meter setting time. In still another embodiment the weighing time is reduced by a modified weighing algorithm which uses a reduced number of samples to determine the weight of a singulated mailpiece when the initial indication of weight is not close to a breakpoint in the postal rates. In another embodiment of the invention the postage meter is modified to initiate common preliminary meter setting functions in response to the presence of a mailpiece on the weighing module and before the appropriate postage amount is determined.

7 Claims, 6 Drawing Sheets

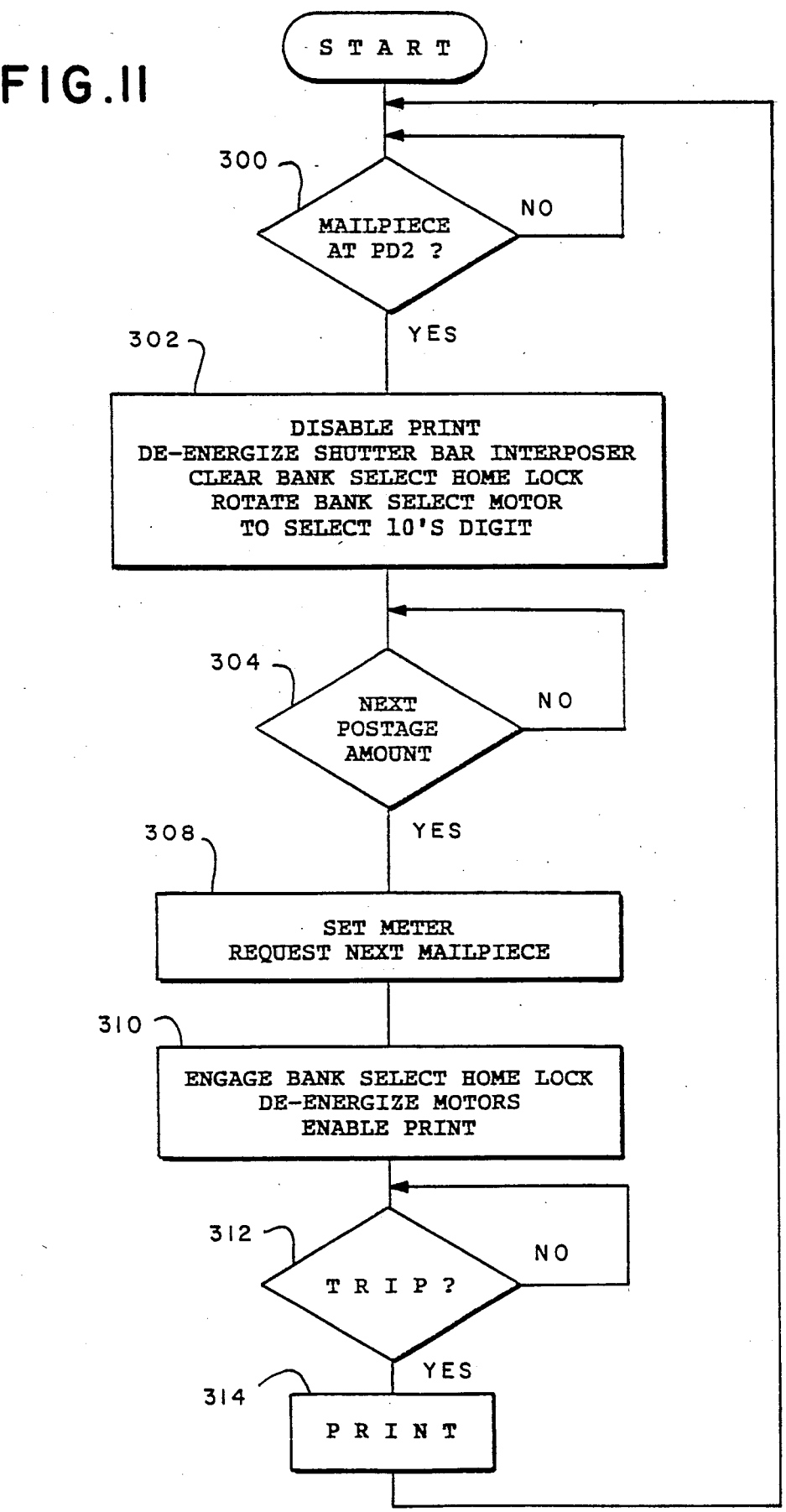

FEEDER MODULE

BACKGROUND OF THE INVENTION

1. Field of the Invention.

Mailing machines are well known. Typical is the Model 6200 system marketed by Pitney Bowes Inc. of Stamford, Conn. Such systems feed mail which is uniform in weight through postage meters, such as the Model 6500 meter also marketed by Pitney Bowes Inc., so that each mailpiece is metered with indicia corresponding to a pre-selected postage amount. It is also known to connect a postal scale (i.e. a scale which computes the necessary postage amount as a function of the weight of a mailpiece and other information input by an operator) to automatically set the postage meter to the necessary postage amount. Such a system is taught in U.S. Pat. No. 4,286,325; to: Dlugos et al.; issued: Aug. 25, 1985. Attempts have also been made to combine postal scales with mailing machines to develop systems for continuously metering batches of mixed weight mail. Such a system would accept batches of mixed weight mail, singulate the mailpieces, weigh the singulated mailpieces, compute the necessary postage amount, set a postage meter accordingly, and meter the singulated and weighed mailpieces with the necessary postage amount. Such systems have heretofore periodically feed mailpieces onto a continuously operating transport system for transport sequentially through a weighing system and a postage metering system without pause. One such system is taught in U.S. Pat. No. 3,904,946; to: Dlugos et al.; issued: Sept. 9, 1975.

Such known mixed mail systems have several disadvantages. Since the transport system is continuously operating, massive isolation of the weighing system, and expensive balanced components for the transport system are necessary to sufficiently reduce the effects of vibration on the weighing system. Also, continouous transport requires an increased size for mixed weight mailing systems because the weighing system must have a minimum length to assure that the continuously moving mailpiece will be wholly supported by the weighing system for the time necessary to determine its weight. Further, in previously known systems once the transport speed and weighing system length were chosen the time each mailpiece was on the weighing system was fixed and it was not possible to take advantage of improved weigh time capability, resulting from improved scale technology, without a major mechanical re-design of the entire mixed weight mailing system. Thus previously known mixed weight mailing systems have been, in general, large, massive, expensive, systems, suitable only for use by high volume mailers.

"Singulation" (i.e. the separation of exactly one mailpiece from a batch or stack of mailpieces to be processed) has also been a problem in mixed weight mail systems. Mixed weight implies a larger variation in thickness among mailpieces and prior singulating devices capable of handling a large piece to piece range of thicknesses have been complex and expensive, or unreliable.

Thus it is an object of the subject invention to provide a relatively small, less massive, inexpensive, "tabletop" system suitable for use by low and medium volume mailers.

It is another object of the subject invention to provide a mixed weight mailing system where the weighing system is modular and may be easily added to an otherwise substantially conventional mailing machine.

It is still another object of the subject invention to provide a mixed weight mailing system having improved singulating capability.

SUMMARY OF THE INVENTION

The above objects are achieved and the disadvantages of the prior art are overcome in accordance with the subject invention by means of a mailing system which includes a feeder system for sequentially singulating mailpieces from a batch of mailpieces; a weighing system for weighing the singulated mailpieces, computing the necessary postage amounts for each of the singulated mailpieces as a function of their weight, and transmitting the necessary postage amounts; a postage meter connected to the weighing system for receiving the necessary postage amounts, setting indicia to correspond to the necessary postage amounts and printing each of the singulated mailpieces with indicia corresponding to the necessary postage amount; and a transport system for sequentially transporting the singulated mailpieces from the weighing system to the postage meter when the indicia are set to correspond to the necessary postage amount and substantially simultaneously sequentially transporting the next of the singulated mailpieces from the feeder system to the weighing system; then halting while the next singulated mailpiece is weighed and until the indicia are set to correspond to the next of the necessary postage amounts. This transportation cycle continues until each piece of the batch of mailpiece is printed with indicia corresponding to the necessary postage amount.

In a preferred embodiment of the subject invention the mailing machine and postage meter, weighing system, and feeder system, are each modular units so that the weighing system may be easily added to an otherwise substantially conventional mailing system, and so that the physical connections between systems are minimized to reduce the effects of vibration in the total system on the speed and accuracy of weighing.

In another preferred embodiment of the subject invention a buffer system may be added to the mailing system between the weighing system and the mailing machine so that mailpieces may be transported from the weighing system to the buffer as soon as the necessary postage amount is computed. Mailpieces wait on the buffer system while the postage meter is being set to correspond to the necessary postage amount. This allows the next mailpiece to be transported to the weighing system during the time the postal meter is being set, reducing the overall cycle time for the mailing system.

The mailing system of the subject invention may be provided with an improved singulator apparatus which includes a reverse roller and urge belts. A d.c motor is controlled to provide a reverse force on mailpieces passing between the reverse roller and a high friction feed wheel so that the reverse force is sufficient to prevent the feeding of "doubles". The urge belts feed mailpieces into the nip of the reverse roller and feed wheel with a horizontal orientation.

The mailing system of the subject invention may also be provided with a weighing module which includes a transducer for producing electrical signals indicative of the vertical forces applied to the weighing module; a microprocessor for receiving the electrical signals, determining the weight of a mailpiece in accordance with the signals and determining the appropriate postage amount in accordance with the weight, and for transmitting the postage amount to a postage meter; a transport apparatus for transporting the mailpieces onto the weighing module from a feeder module and for transporting mailpieces off of the weighing module for metering after transmittal of the postage amounts; and a controller for controlling the transport apparatus. The controller energizes the transpart apparatus to transport the mailpieces off of the weighing module after they are weighed; transmits a signal to the feeder to feed the next of the mailpieces onto the transport apparatus; and transports the next of the mailpieces onto the weighing module and then deenergizes the transport apparatus to halt the next mailpiece for weighing.

Those skilled in the art will recognize that the subject invention advantageously achieves the objects set forth above and overcomes the disadvantages of the prior art; particularly that a quiet time for weighing is created since the operation of the mailing system and the tranport system are halted during the weighing time, and that the transport of the next mailpiece onto the weighing system occurs during the print cycle of the postage meter; the time of relatively high vibration. This allows a low mass inexpensive system, suitable for "tabletop" operation by low and medium volume mailers.

It is another advantage of the subject invention that it may be operated in one of several modes depending on the characteristics of the items to be mailed. For mixed mail the system operates in a mode where postage is determined for each mail piece in a batch and the meter is set accordingly. For mail requiring a uniform, but unknown, postage amount the system operates in a mode where postage is determined for only the first mailpiece and the meter is set once for the entire batch of mailpieces. In still another mode of operation packages or other bulky items may be weighed on a separate platform, the meter set and a tape generated without operation of the transport system. Finally, for batches of mailpieces with uniform, known postage the system may operate in a mode where the meter is pre-set; allowing operation at the maximum throughput of the meter.

Other objects and advantages of the subject invention will be apparent to those skilled in the art from consideration of the attached drawings and the detailed description of preferred embodiments set forth below.

BRIEF DESCRIPTION OF THE DRAWINGS

FIG. 11 is a flowchart of postage meter software used in an embodiment of the subject invention.

DETAILED DESCRIPTION OF THE PREFERRED EMBODIMENT

Figure 1:
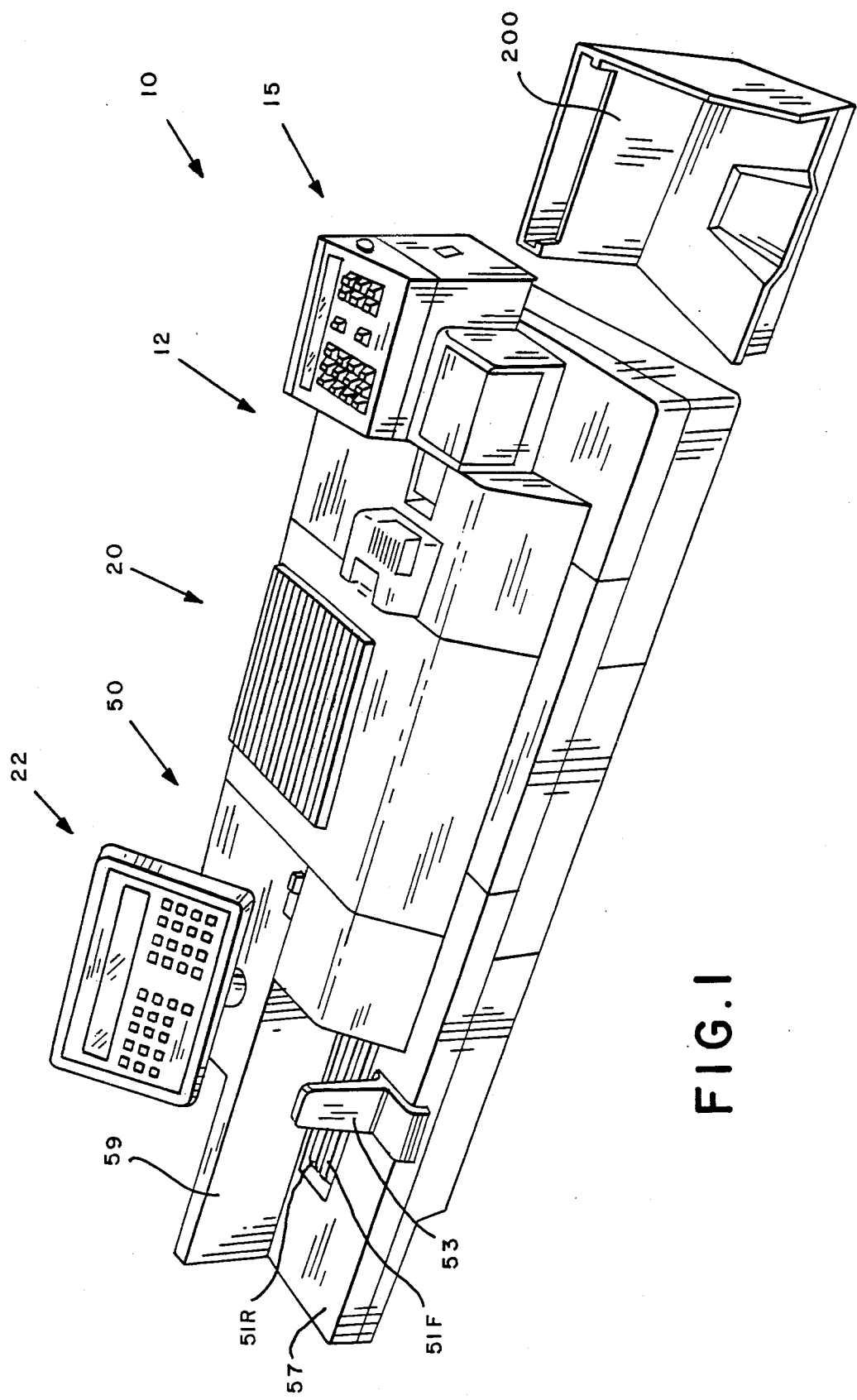
FIG. 1 is a perspective view of a mixed weight mailing system in accordance with the subject invention.
Figure 2:
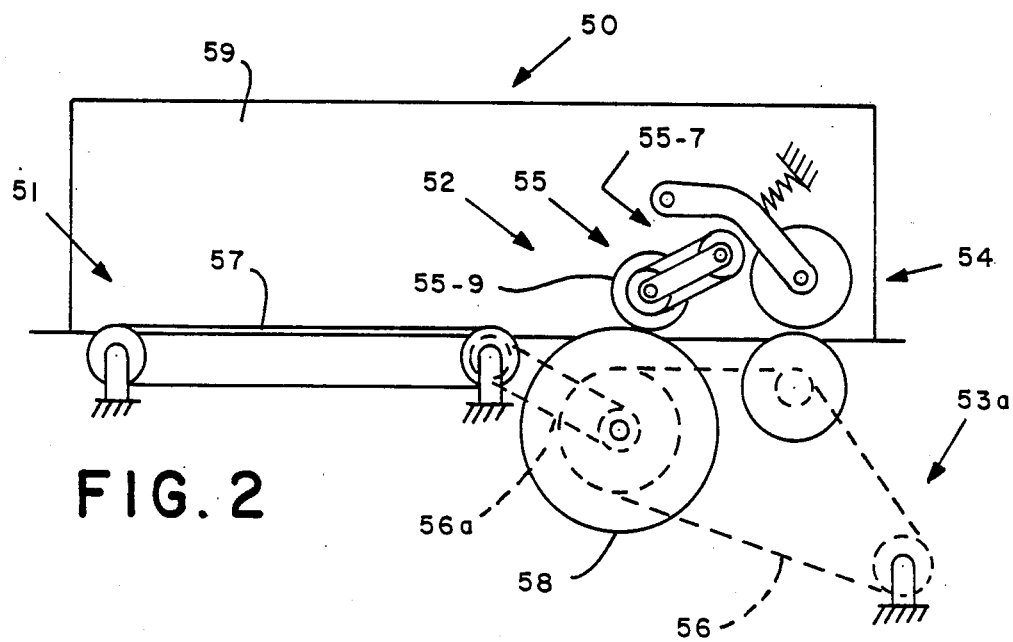
FIG. 2 is a semi-schematic illustration of a feeder module in accordance with the subject invention.

FIG. 1 shows mailing system 10 in accordance with the subject invention. System 10 includes a conventional mailing machine 12 which further includes a conventional postage meter 15. Mailing machine 12 is preferably a Model 6200 mailing machine while postage meter 15 is preferably a Model 6500 postage meter; both marketed by Pitney Bowes Inc. of Stamford, Conn. In a preferred embodiment of the subject invention meter 15 may be modified to reduce its setting time, as will be described below.

Scale module 20 is physically and electrically connected to mailing machine 12. Electrically module 20 functions substantially in the same manner as known stand alone scale/meter systems; module 20 weighs objects, computes postage values as a function of the weight of the object and of other information entered by an operator through keyboard 22 and transmits the computed postage value to meter 15, all in a known manner substantially similar to that disclosed in the above referenced U.S. Pat. No. 4,286,325. Preferably the load cells, weight and postage value determining electronics and functions of scale module 20 are substantially similar to those of known postal scales such as the EMS-5 postal scale, marketed by Pitney Bowes Inc., and need not be discussed further here for an understanding of the subject invention. Modifications relating to control of transport of mailpieces through mailing system 10 will be discussed further below. Other modifications which increase the speed of module 20 without substantially departing from the operation of known postal scales will also be described below.

Feeder 50 is mechanically and electrically connected to scale module 20 to "singulate" mailpieces from a batch of mail and feed the singulated mailpieces to scale module 20. (Singulation is performed by applying a force in the forward direction to one side of the next (i.e. the bottom) mailpiece to feed the next mailpiece, while simultaneously applying a second force to the other side of the mailpiece, the second force being less than the first, forward, force but greater than the frictional forces between mailpieces; thereby preventing the feeding of "doubles".) Feeder 50 is in many respects similar to feeders such as those marketed by Pitney Bowes for use with the Model 6200 mailing machine to feed batches of mail requiring a uniform postage amount. Feeder 50 is however modified in several respects to accommodate batches of mixed weight mail in accordance with the subject invention. The most important of these modifications is the change from synchronous feeding as in the feeders discussed above, to a demand feed operation. That is, the Model 6200 feeder periodically feeds singulated mailpieces directly into mailing machine 12 while feeder 50 feeds mailpieces only in response to a signal from scale module 20. A second important modification relates to the singulation function. The Model 6200 feeder relied upon "stones", fixed elements which applied a controlled drag to mailpieces as they were fed. While this has proven, in general, to be adequate for uniform mail with a small variation in thickness (provided the feeder is properly pre-set for the appropriate thickness) it is not believed adequate for mixed weight mail which may vary in thickness from post card thickness to the maximum acceptable by the mailing machine; about one-fourth inch. Preferably the improved separation necessary for mixed weight mail is achieved through the use of reverse rollers; counterrotating rollers which apply opposed forces to opposite sides of a mailpiece as it is fed. Typically, the forward roller will have a coefficient of friction of about 2 and will be directly coupled to a relatively high torque motor while the reverse roller will also have a high coefficient of friction but will have a controlled torque and will apply a force to the opposite side of the mailpiece being fed approximately equivalent to a coefficient of friction of from about 0.8 to 1. Other modifications to feeder 50 include the substitution of "urge belts" 51 for the "tail piece" used in the Model 6200 feeder to ensure that the batch of mailpieces is in contact with separator 52, and the provision of a mount for keyboard 22. Guide 53 may be included to provide a rough vertical alignment for batches of mailpieces as they are placed in feeder 50 and is conventional.

Feeder 50 also includes moistener 60 (shown schematically in FIGS. 9A and 10A) which is a conventional apparatus used to moisten the flaps of unsealed mailpieces so that they will be sealed by the pressure applied by various rollers as the mailpieces are advanced through a mailing system.

Keybord 22 is substantially similar to the keyboard for the Model EMS-5 postal scale discussed above and allows an operator to enter information necessary for computing the proper postage amounts (i.e. class of service, etc.) for a batch of mailpieces. It differs only in being remotely located on the feeder instead of on the scale itself and in the inclusion of functions related to the transport of mailpieces for different modes of operation of system 10, as will be discussed further below.

In operation a batch of mixed weight mail is placed in feeder 50, weighed by module 20 and metered by postage meter 15 and ejected into stacker 200.

Operation of feeder 50 will be described with reference to FIGS. 2-5. Urge belts 51 project up through platform 57 of feeder 50 and when a stack of mailpieces 50 is placed on feeder 50 the bottom mailpiece is in contact with belts 51F and 51R and is driven forward into the nip of reverse roller 55-9 and feed wheel 58 of singulator 52. Provisions of urge belts 51 allows the mailpieces to be fed into singulator 52 in a substantially horizontal orientation which reduces the bending of mailpieces caused by gravity feed mechanisms (i.e. a tail piece) used in previous mail feeders, which presented mailpieces at a substantial angle to the horizontal. This is particularly advantageous in feeder 50, which is intended to feed mixed weight mail, since the thicker mailpieces which may be encountered in mixed weight mail are more resistant to bending and more likely to feed improperly in a gravity feed system. Further, in prior systems the "tail piece was a physical barrier which tended to block the backward motion of rejected mailpieces"; a problem which is eliminated by the use of urge belts 51.

Feeder 50 also includes a rear registration wall 59 perpendicular to platform 57. In a preferred embodiment of the subject invention registration of the mailpieces against wall 59 is enhanced by mounting urge belt 51F slightly above belt 51R so that a stack of mailpieces is tipped towards wall 59. In another preferred embodiment of the subject invention registration against wall 59 may be further enchanced by modification to the drive of urge belts 51. Power for conventional takeaway rollers 54, feed wheel 58 and urge belts 51 is provided from power takeoff wheel, belt, and pulley assemblies 56 and 56a. By providing separate drive belts for belts 51F and 51R belt 51R may be driven at a slightly higher speed than belt 51F. This will tend to pivot the rear of a stack of mailpieces towards registration wall 59 further enhancing alignment of the mailpieces.

In another preferred embodiment of the subject invention, the singulating action of singulator 52 is enhanced by elevating the rear of belts 51 slightly, but not so greatly as to induce bending, causing a slight increase in the angle of mailpieces at the nip of singulator 52.

Singulation is carried out by the combined actions of feed wheel and reverse roller assembly 55 including reverse roller 55-9. Feed wheel is provided with a surface having a relatively high coefficient of friction and provides a force in the forward direction to drive the bottom mailpiece of a stack towards conventional takeaway rollers 54. Reverse roller 55-9 is driven by reverse roller assembly 55 (which will be described in more detail with respect to FIG. 3) to provide a force in the backward direction to the top of any mailpiece passing through singulator 52. Assembly 55 is designed so that the backward force applied is less than the forward force but greater than any anticipated force of friction between adjacent mailpieces. Thus the bottom mailpiece is driven forward to takeaway roller 54 while any mailpieces carried forward by friction with the bottom mailpiece are held at the nip of singulator 52 by the action of reverse roller 55-9.

Figure 3:
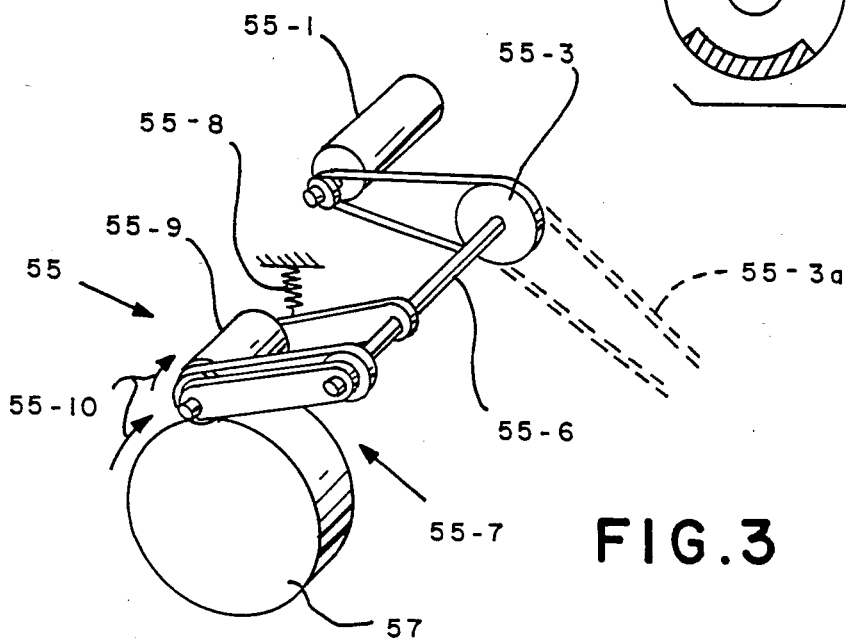
FIG. 3 is a semi-schematic illustration of a reverse roller assembly used in the feeder module of FIG. 2.

FIG. 3 shows further details of reverse roller assembly 55. Assembly 55 is driven by d.c. motor 55-1 through belt and pulley assembly 55-3, shaft 55-6 and second belt and pulley assembly 55-7 to drive reverse roller 55-9 counter to feed wheel 58, as shown by arrows 55-10. Reverse roller 55-9 is held in contact against feed wheel 58 by spring 55-8.

In an alternative embodiment power may be supplied to assembly 55 through alternative belt and pulley drive 55-3a driven by common power source 56.

Where reverse roller 55-9 is driven by d.c. motor 55-1 roller 55-9 may have a relatively high coefficient of friction and the backward force applied may be limited by controlling the torque of d.c. motor 55-1. In the embodiment where roller 55-9 is driven through alternative belt and pulley drive 55-3a the backward force is limited by design of roller 55-9 to have a lower coefficient of friction.

Because of the increased difficulty in separating mixed weight mail, it is believed that it is advantageous for reverse roller 55-9 to provide a backward impulse, as opposed to a constant backward force. By a backward impulse herein is meant a force which is not constant but which rises to a level when first applied then drops back to a second level and then rises again to the first level; possibly repeating these "impulses" two or more times through a cycle of reverse roller 55-9. It is believed that such a "pulse" force, when applied to two adhering mailpieces, will tend to jar the upper mailpiece back.

Figure 4:
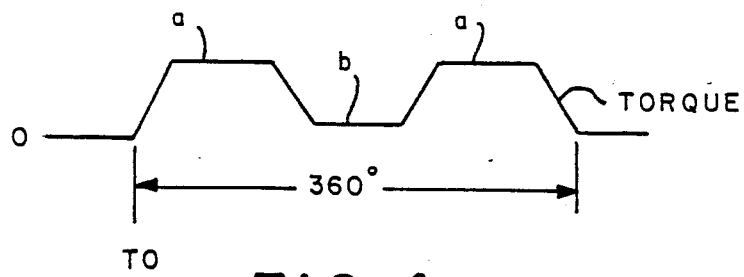
FIG. 4 is a graphic illustration of the torque applied to the reverse roller assembly of FIG. 3.
Figure 5:
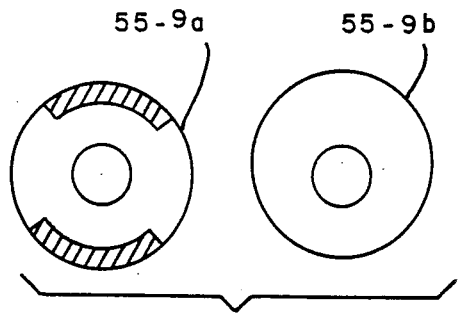
FIG. 5 illustrates various forms of reverse roller which may be used in the assembly of FIG. 3.

As shown in FIG. 4 in the embodiment where power to reverse roller 55-9 is provided through d.c. motor 55-1 such backward impulses may be applied by controlling the torque generated by motor 55-1, as is shown. The torque of motor 55-1 is controlled by a conventional d.c. motor controller (not shown) first to rise to level a, drop back to level b, return to level a and drop back to zero in one cycle of roller 55-9. Of course, motor 55-1 may be controlled to provide any number of "impulses" and is not limited to two as shown in FIG. 4.

Where assembly 55 is driven from a constant, common power source through alternative belt and pulley assembly 55-3a backward impulses may be provided through alternative reverse rollers 55-9a and 55-9b as shown in FIG. 5. Roller 55-9a is provided with inserts having a substantially different coefficient of friction from roller 55-9; resulting in a change in the backward force applied by reverse roller 55-9a as areas of different coefficient of friction bear against the mailpiece. Backward impulses may also be provided by reverse roller 55-9b which is mounted on an off-center axis so that the normal force applied by spring 55-8 varies as roller 55-9b rotates, and thus the backward friction force between roller 55-9b and the mailpiece varies.

Figure 6:
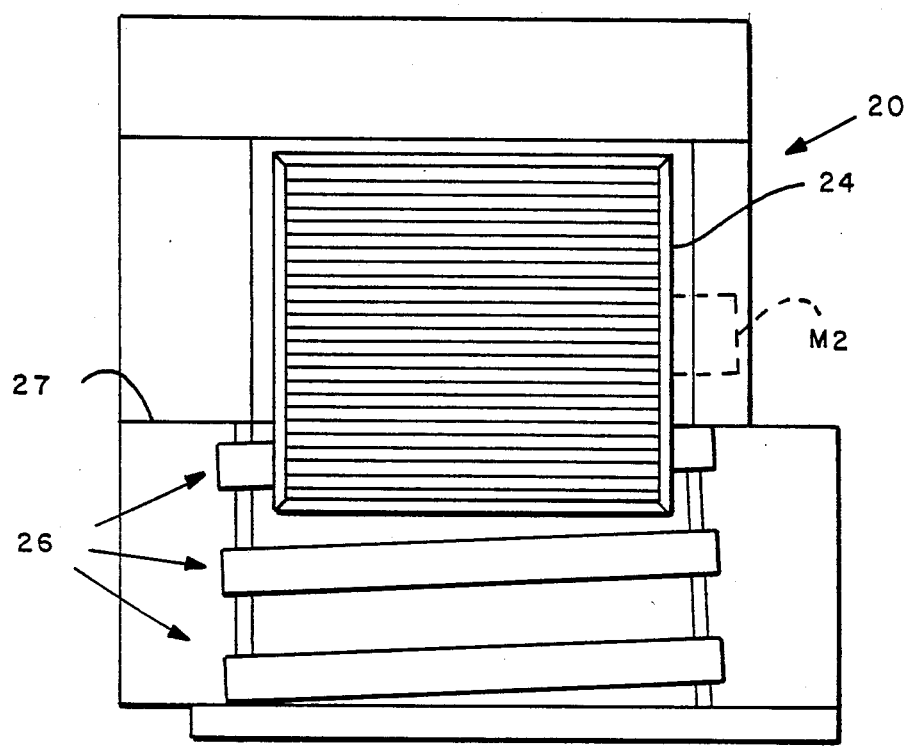
FIG. 6 is a semi-schematic top plan view of a weighing system module in accordance with the subject invention.

FIG. 6 shows a semi-schematic top plan view of scale module 20. Belts 26 advance singulated mail from feeder 50 onto module 20 and are powered by motor M2. Preferably belts 26 are angled slightly toward wall 27 to further align mailpieces before they are fed to mailing machine 12. Platform 24 is mounted above belt 26 and is provided so that mailpieces which are too large to be fed through feeder 50 may be weighed separately as will be described further below.

Figure 7:
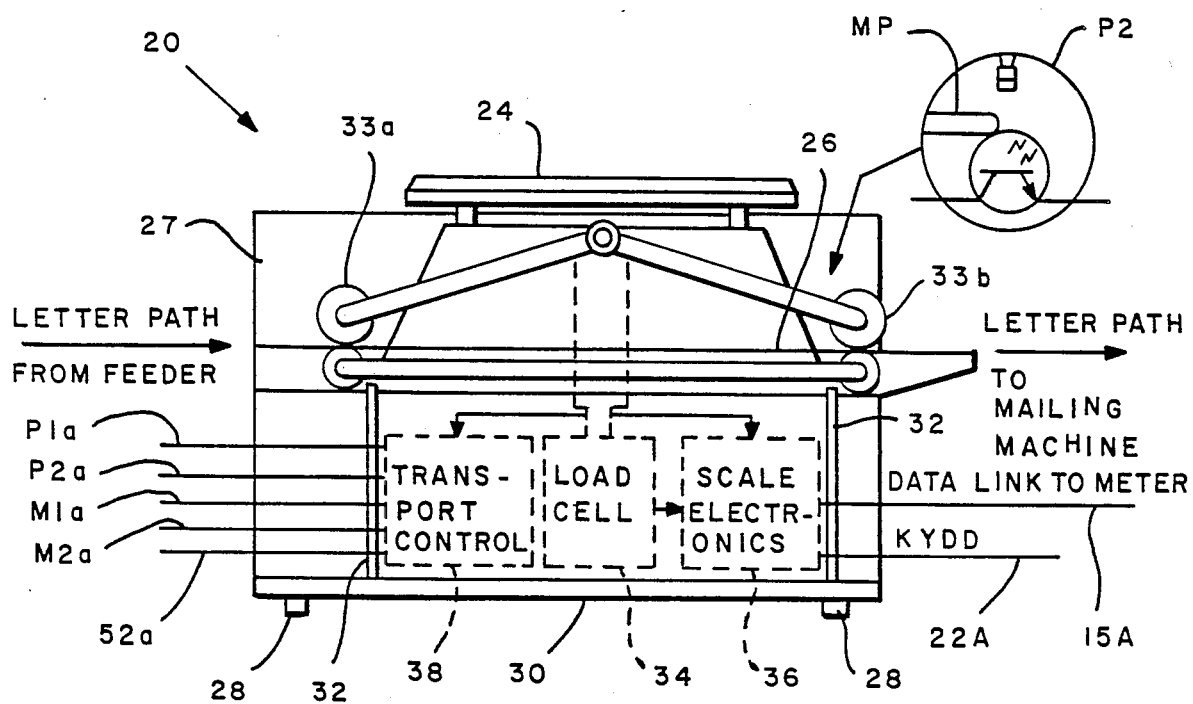
FIG. 7 is a semi-schematic side view of the weighing system module of FIG. 2, with a detail showing a photodetector unit for detecting the location of mailpieces.

FIG. 7 shows a semi-schematic plan side view of weigh module 20. As may be seen in FIG. 7 module 20 further comprises damping supports 28, a base structure 30, and overload protection supports 32. Supports 28 are preferably of a vibration damping material as is taught in U.S. Pat. No. 4,479,561; to Feinland et al.; issued: Oct. 30, 1984 and isolate base 30 from environmental vibrations; base 30 provides a mechanical ground reference, and supports 32 protect load cell 34 from overloads. Load cell 34 provides an analog output signal proportional to the force applied. Conventional electronic circuitry converts the analog signal to a digital output which can be used by scale electronics 36. Electronics 36 computes the weight of a mailpiece on belt 26, or platform 24, as a function of the load cell digital output signal and then determines the proper postage amount as a function of the weight and other information (e.g. class of service, etc.) input by an operator through keyboard 22 and transmitted to electronics 36 over link 22A. Once the proper postage amount is computed electronics 36 transmits this amount to meter 15 through link 15A and meter 15 sets its indicia to correspond. As discussed above this function of setting a postage meter in accordance with a determined weight is well known to those skilled in the art and need not be discussed further here for an understanding of the subject invention.

In FIG. 7 module 20 further includes transport control 38. Transport control 38 controls motor 1 (not shown), which powers feeder 50, through line M1a and controls motor M2, which powers belt 26 in scale module 20, through line M2a. Transport control 38 also controls separator 52 through line 52a, since in the embodiments shown separator 52 is powered by a separate motor. However it should be noted that, as will be described further below, in the embodiment shown operation of separator 52 is simultaneous with operation of feeder 50 it may prove preferable to use only a single motor for both feeder 50 and its separator 52. Transport control receives inputs from photodetector P1, which is located in feeder 50 and shown in FIGS. 4A and 5A; and from photodetector P2 shown in detail in FIG. 3 and located just forward of rollers 33b. Photodetectors P1 and P2 provide signals to controller 38 indicating the position of singulated mailpieces MP in the system over lines P1a and P2a. Transport control 38 is also connected to meter 15 through scale electronics 36 and link 15A to receive a signal indicating that the indicia of meter 15 have been properly set. In response to signals from photo detectors P1 and P2 and the signal from meter 15, transport control 38 controls the transport of mailpieces through system 10 in a manner more fully described below.

Those skilled in the arts will realize that scale electronics 36 typically includes a microprocessor for computing weights and postage amounts and that much of the logic of transport control 38 may be handled by the microprocessor of electronics 36. However, for simplicity of explanation in the following discussion it will be assumed that the control of the transport function is carried out separately from the scale functions per se.

As can be seen from the details in FIGS. 3, 4A, and 5A photo detectors P1, P2, and P3 are conventional devices which detect the presence of objects (in this case mailpieces mp) through interruption or reflection of a light beam.

As will be further described below, transport control 38 controls the positioning of a mailpiece for weighing. In a preferred embodiment of the subject invention a mailpiece is transported as far downstream towards meter 15 as possible. How far a mailpiece may be transport is limited by the necessity that the mailpiece be wholly supported on module 20 for weighing, and, as will also be described further below, the necessity for a minimum transport time in certain preferred embodiments of the subject invention, to allow completion of the setting cycle for meter 15 after transport of a mailpiece from module 20 to meter 15 has begun. Positioning a mailpiece for weighing as far downstream as possible assures that, in the next cycle, printing of the postage indicia will occur as early as possible, thus reducing the effects of vibration on the next weighing cycle.

Figure 8:
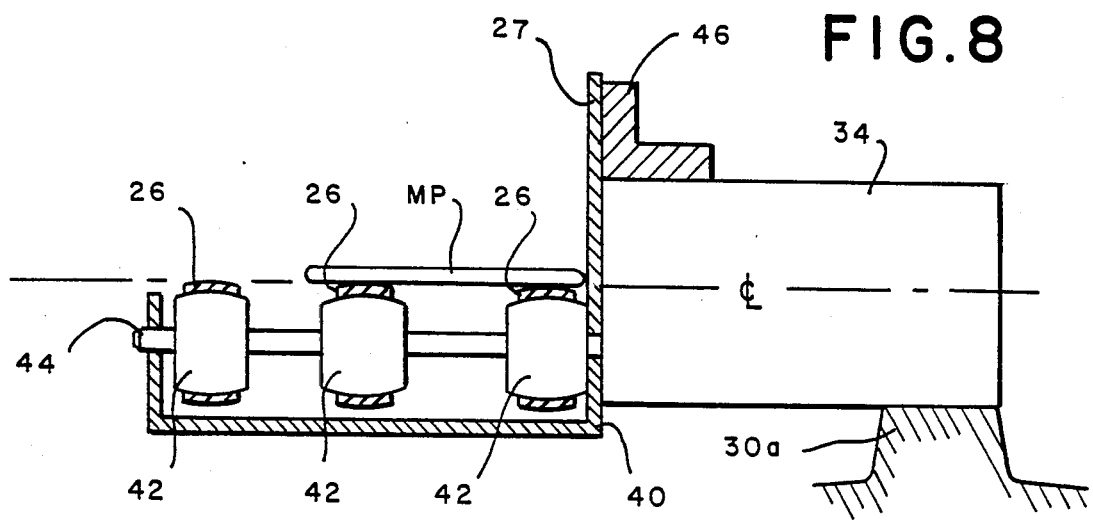
FIG. 8 is a cross-section view of an alternative mounting arrangement for a load cell in the weighing module of FIG. 6.

A problem with this embodiment is that when a mailpiece above the horizontal centerline of load cell 34 is stopped a torsional load is coupled into load cell 34, and may impart oscillations which will increase weigh time and reduce the accuracy of weighing. A modified version of module 20, which reduces this effect, is shown if FIG. 8. In the embodiment of FIG. 8 load cell 34 is mounted so that its horizontal centerline $\mathcal{L}$ is substantially aligned with the top surfaces of belts 26. This arrangment substantially reduces the torsional load seen by load cell 34 when mailpiece mp stops. Member 40 supports rollers 42 through shafts 44 and is mounted on the load point of load cell 34 through bracket 46 so that the top surface of belts 26, which are supported and driven by rollers 44, is substantially aligned with centerline $\mathcal{L}$ of load cell 34. Load cell 34 is mounted on elevated portion 30a of base 30 to support member 40 above base 30 with sufficient clearance to allow weighing.

The outer surface of the vertical portion of member 40 may comprise wall 27, or an adjustable false wall may be fixed to member 40 to form an adjustable aligning wall 27.

AUTOMATIC OPERATION

Figure 9:
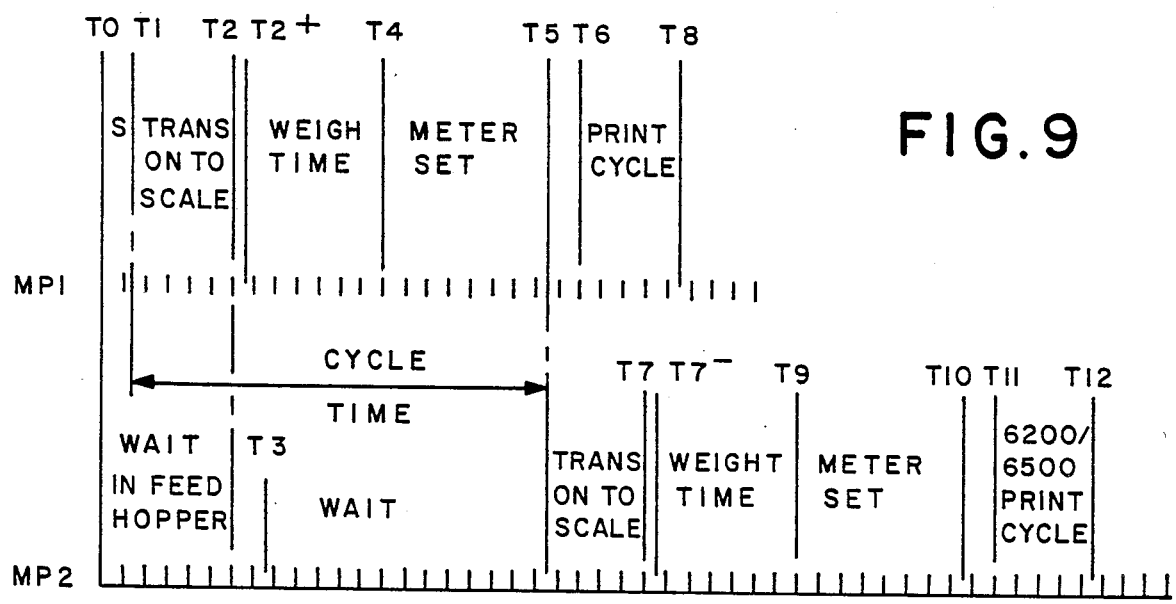
FIG. 9 is a timing diagram of a first embodiment of the subject invention.
Figure 9A:
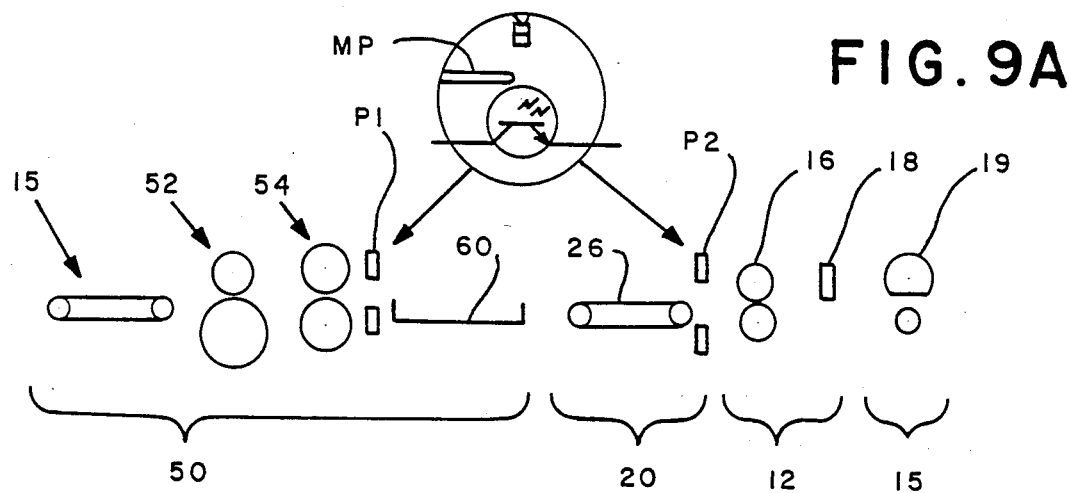
FIG. 9A is a schematic representation of the transport system of the embodiment of FIG. 9 with a detail of the photodetectors P1 and P2.

FIG. 9 shows a timing diagram for the automatic operation of one embodiment of the subject invention and FIG. 9A shows a schematic diagram of the transport system of that embodiment. At time T0 (i.e. when the start button is pushed) the motor for feeder 50 and motor M2 are turned on, as is singulator 52. Urge belts 51 advance the mailpiece mp1 to singulator 52 where any possible "doubles" are eliminated and the mailpiece mp1 is singulated at time T1. Mailpiece mp1 continues through takeaway rollers 54 until its leading edge reaches photodetector P1. At this time transport control 38 recognizes that there is a mailpiece at photo detector P1 and no mailpiece at photodetector P2. At T1 transport control 38 tests for a stable zero weight on scale module 20. Preferably all motors should be turned off during this test. If scale electronics 36 indicate a non-zero weight system 10 halts and waits for scale module 20 to zero. Assuming a zero weight at T1 transport control 38 transports mailpiece mp1 onto belt 26 until the leading edge of mailpiece mp1 is detected by photo detector P2 at time T2. At T2 transport control 38 signals scale electronics 36 that weight determination may begin and stops mailpiece mp1. Preferably mailpieces will be stopped on scale module 22 in a manner which will allow approximately 2 inches of overshoot until time T2+ so as to minimize the transport time from weigh module 20 to mailing machine 12. Feeder 50 continues to operate until time T3 to singulate the next mailpiece mp2 at time T3 and then stops. By time T4 scale module 20 will determine the weight of mailpiece mp1 and compute the corresponding postage amount. Scale module 20 then transmits this postage amount to postage meter 15 over link 15A and postage meter 15 then sets its indicia correspondingly. When the indicia are properly set postage meter 15 signals transport control 38 at time T5 through link 15A and scale electronics 36. At time T5 transport control 38 again turns on motors M1 and M2 and singulator 52 to begin transport of mailpiece mp1 from scale module 20 to mailing machine 12 and mailpiece mp2 from feeder 50 to scale module 20. At time T6 mailpiece mp1 is taken by sealer rollers 16 and a print cycle begins. At time T7 mailpiece mp2 is transported onto scale module 20 and the next weigh cycle begins. At time T6 mailpiece mp1 is advanced by sealer rollers 16 until it reaches trip switch 18 which initiates printing by drum 19. At time T8 mailpiece mp1 is printed with indicia corresponding to the appropriate postage and ejected to stacker 200. Mailing machine 12 is an asynchronous machine which operates continuously, and once a mailpiece is taken by sealer rollers 16 a print cycle will automatically continue until completion. At time T9 the weigh time for mailpiece mp2 is completed and at time T10 meter 15 is again appropriately set and the mailpiece for the next cycle (not shown) is advanced onto scale module 20. From times T11 to T12 the print cycle for mailpiece mp2 is completed. The operation as described will then continue until all mailpieces are properly metered.

It should be noted that it is a feature of the present embodiment that each stage of the above described cycle is initiated by completion of the preceding stage. Thus transport of mailpieces from feeder 50 to scale module 20 and from scale module 20 to mailing machine 12 is initiated when meter 15 signals that it is appropriately set, and the setting of meter 15 is initiated only when scale module 20 signals the proper postage amount for the mailpiece. Such asyncronous operation allows system 10 to take advantage of the normal situation where even in batches of mixed weight mail successive mailpieces will frequently have similar weights and postage amounts. In a syncronous system each cycle must be allotted sufficient time for the worst case situation; weighing of the largest mailpiece and making the maximum change in postage amount. In the subject invention the full benefit of more typical conditions is attained, and, when weights may be quickly obtained and meter settings need not be changed, the cycle times may approach the maximum rate of mailing machine 12. As noted above asyncronous, demand operation in accordance with the subject invention also allows the opportunity to take advantage of improvement in weighing techniques which would reduce the weigh cycle time without the need for mechanical redesign of the system and permits operation under conditions of high vibration with only a degradation of the system throughput.

In the embodiment of FIG. 9 if we assume mailpieces with a maximum weight of approximately 8 ounces and length of approximately 13 inches, transport speed of 30 inches per second, a maximum weigh time of approximately 0.7 seconds and a maximum meter setting time of approximately 0.75 seconds, and a separation of approximately 4 inches from P1 to scale module 20 and approximately 2 inches (assuming a 2 inch overshoot) between scale module 20 and sealer roller 16 the approximate maximum cycle time, measured from T1 to T5 is approximately 2 seconds or 30 mailpieces per minute. Assuming that the maximum weigh time can be reduced to 0.5 seconds and the maximum meter setting time reduced to 0.4 seconds the maximum cycle time would be approximately 1.33 seconds, or 45 mailpieces per minute.

In another embodiment of the subject invention such an improved weigh time may be achieved by taking advantage of the incremental nature of postal rates, which for first class mail, for example, change at 1 ounce intervals. Typically an electronic scale such as the above mentioned EMS-5 will determine that a steady weight condition has been achieved when three successive count signals within a pre-selected band are detected. Two successive signals are not considered sufficient for the necessary accuracy, typically one-thirty second of an ounce, since the load cell signal in an unstable condition might be making an upward excursion through the preselected band when a first count is measured and a downward excursion when the next is measured. Experience has shown that the three successive signals within a pre-selected band of each other are generally sufficient to indicate a stable weight within the necessary accuracy. A substantial improvement, however, may be achieved in the average worst case weighing time by determining weights based on two successive count signals when the indicated weight is sufficiently far from the breakpoints in the postal rates. Thus, for example, assuming a necessary accuracy of one-thirty second of an ounce, if two successive count signals indicated the same weight between one-eighth of an ounce and seven-eighths of an ounce that indication could be accepted as a valid weight. When the indication was of a weight closer to the breakpoint three or more signals would be used to determine the weight in the conventional manner.

In another embodiment of the subject invention an improvement in the average worst case meter setting time can be achieved by taking advantage of the fact that each time a conventional postage meter, such as meter 15, sets its indicia certain common preliminary steps are carried out. Thus, for example, typical postage meters include multiple banks of digit indicia (e.g. tens of cents, cents, and tenths of cents) which are set sequentially. Thus each change in indicia begins by driving the meter setting motor to one particular bank which is always set first. Other preliminary steps in meter setting will be familiar to those skilled in the art. Since these preliminary steps produce relatively little vibration in comparison to the actual printing of the indicia, it is possible to achieve an improvement in the average worst case meter setting time by modifying the software of meter 15 to begin the preliminary steps to set the indicia when a signal indicating the presence of a mailpiece at photo detector P2 is received. Thus the preliminary, common steps in setting meter 15 may be overlapped with the weigh time, leaving only the actual setting of the indicia to the selected postage amount to be completed after the proper postage amount is computed by scale module 20.

In FIG. 11 software modifications to decrease the effective setting time of meter 15 are shown. At 300 meter 15 tests for the presence of a mailpiece mp on weighing module 20 as indicated by the output of photodetector $PD_2$. Presence of a mailpiece MP at photodetector $PD_2$ implies that the next postage amount will be computed and transmitted to meter 15. Therefore at 302 meter 15 begins the common, lowvibration preliminary steps necessary prior to resetting meter 15. At 304 meter 15 tests for the next postage amount. When the next postage amount is received at 308 meter 15 signals transport control 38 to request a mailpiece mp and resets for the next value. (Note that where sequences of mailpieces mp requiring the same postage amount are common some delay with respect to the conventional meter setting routine may result. However, because any unnecessary preliminary set-up can be reset during the transport time from weigh module 20 to meter 15, this is not expected to be a great disadvantage.)

At 310 meter 15 takes the steps necessary to re-enable printing after reset. Simultaneously mailpiece mp is transported to meter 15. At 312 detection of a trip signal initiates printing at 314. (Note that delay may be easily incorporated into response to the request sent at 308 if necessary to avoid mailpieces mp from reaching trip switch 18 before printing is enabled.)

Modification of the software for meter 15 as described above and in accordance with the flow charts shown in FIG. 11 would be a routine task for a programmer of ordinary skill and need not be discussed further for understanding of the subject invention. It is expected that overlapping of these preliminary steps with the weigh time will reduce the remaining meter setting time to approximately 0.4 seconds and, since the preliminary steps are also steps which produce little vibration, this can be achieved without affecting the weigh time.

By implementing these improvements in the weigh time and the meter setting time, on the assumption set forth above, an average worst case cycle time of approximately 1.33 seconds, or 45 mailpieces per minute can be achieved.

Figure 10:
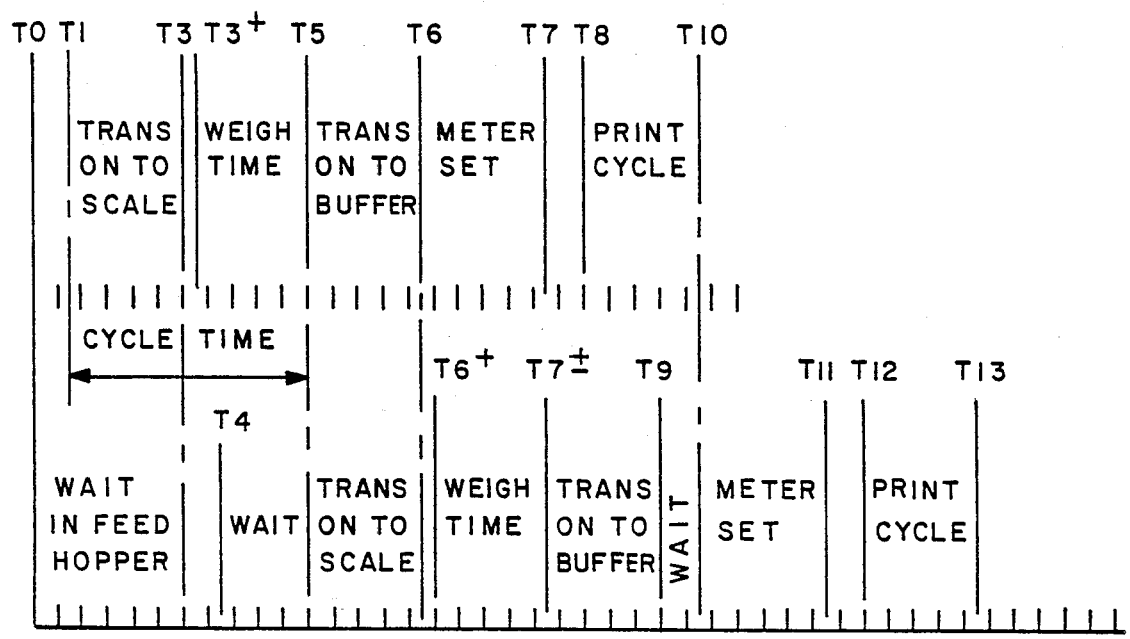
FIG. 10 is a timing diagram of the operation of a second embodiment of the subject invention.
Figure 10A:
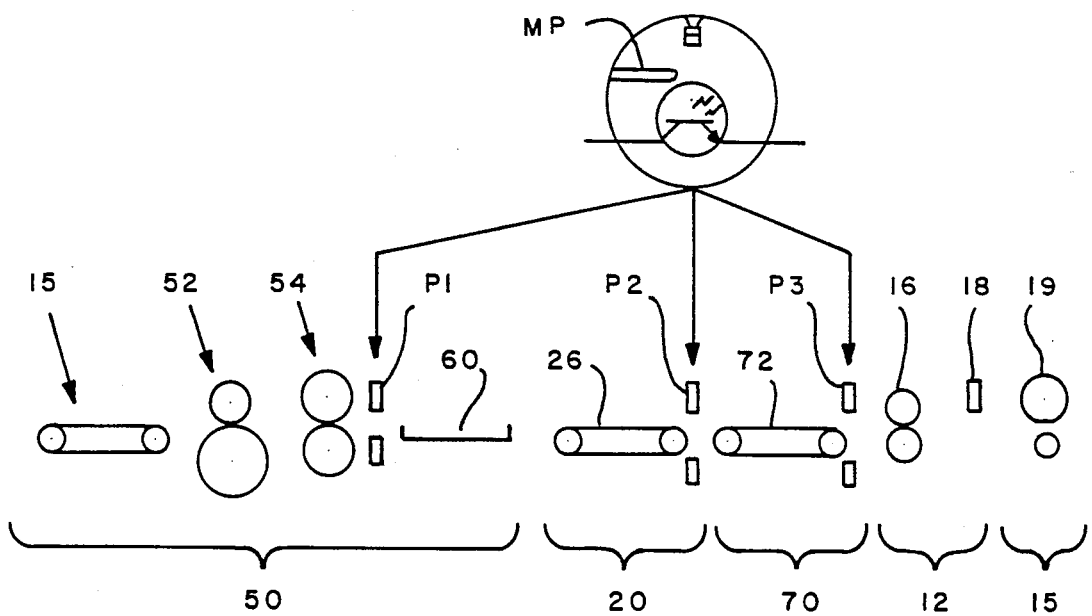
FIG. 10A is a schematic representtion of the transport system of the embodiment of FIG. 10 with a detail showing the photodetectors P1, P2 and P3.

A still further improvement in the cycle time may be achieved by means of another embodiment as shown in FIGS. 10 and 10A. FIG. 10 shows a timing diagram for this embodiment and FIG. 10A shows a schematic representation of the transport system of this embodiment. The transport system of FIG. 10A is modified by the addition of a mechanical buffer 70 which includes belt 72, photo detector P3 and a motor (not shown).

As described above at time T0 all motors are turned on and the first mailpiece MP1 is singulated from time T0 to T1. At time T1 transport control 38 again checks for zero weight and, assuming zero weight, transports mailpiece mp1 onto scale module 20 from times T1 to T3. Again a controlled overshoot of approximately two inches occurs from time T3 to time T3+, and the next mailpiece mp2 is singulated from time T3 to time T4. The weigh time for mailpiece mp1 is from time T3 to time T5 and a mailpiece mp2 waits at photo detector T1 until time T5. At time T5 transport control logic 38 controls the transport of mailpiece mp1 onto belt 72 and simultaneously transports mailpiece mp2 onto scale module 20. Both transfers occur from time T5 to time T6; though those skilled in the art will immediately recognize that there may be minor differences in the duration of the two transport times. Since there is no print cycle occuring for mailpiece mp1 at time T6 when mailpiece mp1 reaches photo detector P3 the corresponding postage amount is transmitted to meter 15 which sets from time T6 till time T7. During the time from T6 to T7± mailpiece mp2 is being weighed on scale module 20. At time T7 meter 15 signals transport control 38, through link 15A and scale electronics 36, that setting is complete and transport control 38 transports mailpiece mp1 from buffer 70 to mailing machine 12. At time T8 mailpiece mp1 is caught by sealer rollers 16 and the print cycle begins. Concurrently from time T7± until time T9 mailpiece mp2 is transported onto buffer 70 until it reaches photo detector P3 at time T9. At time T9 buffer 70 halts and waits until the print cycle for mailpiece mp1 is completed at time T10. From time T10 until time T11 meter 15 is set to correspond to the proper postage amount for mailpiece mp2 and at time T11 meter 15 signals that it is set. At time T11 transport control 38 controls the transport of mailpiece mp2 to mailing machine 12 and simultaneously transport succeeding mailpieces (not shown) onto buffer 70 and scale module 20. At time T12 mailpiece mp2 is caught by sealer roller 16 and the print cycle for mailpiece mp2 occurs from time T12 to time T13.

From examination of FIG. 10 it can be seen that the shown embodiment substantially overlaps the weigh time with the meter setting time for successive mailpieces. This overlap reduces the cycle time, measured from time T1 to time T5 and using the same assumptions as above, to approximately 1.09 seconds, or approximately 55 mailpieces per minute.

Consideration of the timing diagrams of FIGS. 9 and 10 will also demonstrate to those skilled in the art that the relationship between transport of a mailpiece from weighing module 20 to mailing machine 12 and transport from feeder 50 to weighing module 20, as taught in the present application, may be used advantageously even in continuous systems (i.e. systems where mailpieces move continuously and weighing time is fixed) by arrangement so that transport from feeder 50 always substantially overlaps printing by meter 15; then the effects of vibration from printing on the weighing time may be substantially reduced. This may be achieved by assuring that the transport time from weighing module 20 to mailing machine 12 plus the time required for meter 15 to print the indicia is substantially equal to the transport time from feeder 50 to weighing module 20, and that all transport starts at substantially the same time.

Other Modes Of Operation

The systems of the subject invention are capable of additional modes of operation in response to operator selection through keyboard 22. If the operator selects a manual mode of operation he may enter a predetermined postage amount to meter 15 and feed a batch of uniform mail through system 10. In this mode scale module 20 will not determine the weight or postage amount and transport control 38 will continuously transport successive mailpieces through system 10 at approximately the maximum operating rate of mailing machine 22; approximately 120 mailpieces per minute.

In a second mode of operation an operator may feed a batch of uniform, but unknown, weight through system 10 in a semi-automatic mode. In this mode the first mailpiece will be weighed and the postage amount determined and meter 15 set correspondingly, as described above, but following mailpieces will not be weighed and the system will again operate at approximately the maximum operating rate of meter 15.

In still another mode of operation a small package or other bulky mailpiece may be placed on platform 24. When transport control 38 detects a non-zero weight with no mailpiece at photodetector P2 it will stop transport and the operator may use mailing machine 12 to generate a meter tape (i.e. an adhesive tape with postal indicia printed on it) which can then be placed on the package or other mailpiece. Generation of meter tapes by known mailing machines such as the Pitney Bowes Model 6200 is well known and need not be discussed further here for an understanding of the subject invention.

The above embodiments have been described by way of illustration only, and those skilled in the art will recognize many other embodiments from the above descriptions and the attached drawings. Accordingly limitations on the subject invention are to be found only in the claims set forth below.

What is claimed is:

1. A feeder for singulating mailpieces from a plurality of mailpieces, comprising:
   (a) a substantially horizontal platform for receiving said plurality of mailpieces, said mailpieces being stacked horizontally on said platform;
   (b) singulating means, including a reverse roller and feed wheel assembly having a nip substantially aligned with the upper surface of said platform, for singulating mailpieces from said plurality of mailpieces;
   (c) urge belt means projecting above said upper surface of said platform for driving the bottom mailpiece of said stacked plurality of mailpieces into said nip of said reverse roller and feed wheel assembly;
   (d) drive means for simultaneously driving said urge belt means and singulating means, whereby said bottom mailpiece is driven into the nip of said reverse roller and feed wheel assembly and singulated from any others of said mailpieces carried with said bottom mailpiece; and
   (e) a registration surface normal to said platform and parallel to the direction of feed of said mailpieces for aligning said mailpices prior to singulation, and wherein said urge belt means further comprises a front belt and a rear belt, said front belt being spaced further from said registration surface than said rear belt, said rear belt being driven at a faster rate than said front belt, and the top surface of said front belt being above the top surface of said rear belt, whereby said stacked plurality of mailpieces is tilted toward said registration surface and their alignment is enhanced.

2. A feeder as described in claim 1 wherein said urge belts are tilted downwards towards said singulating means an amount sufficient to enhance feeding of said mailpieces into said nip without bending of said mailpieces.

3. A feeder as described in claim 1 wherein said urge belts are tilted downwards towards said singulating means an amount sufficient to enhance feeding of said mailpieces into said nip without bending of said mailpieces.

4. A feeder as described in claim 1 wherein said reverse roller and feed wheel assembly includes a reverse roller driven by a d.c. motor, the output torque of said d.c. motor being controlled to generate said backward impulse.

5. A feeder as described in claim 1 wherein said reverse roller and feed wheel assembly includes a reverse roller having a coefficient of friction which varies around the circumference of said reverse roller so as to generate said backwards impulse.

6. A feeder as described in claim 1 wherein said reverse roller and feed wheel assembly includes an eccentrically mounted reverse roller, whereby the normal force between said reverse roller and said feed wheel varies to generate said backwards impulse.

7. A feeder as described in claim 1 wherein said reverse roller and feed wheel assembly apply a forward force to the bottom and a backward impulse to the top of said mailpieces as they are singulated.

* * * * *